Dec. 25, 1962 S. J. SARNOFF 3,070,301
CONTROL SYSTEMS
Filed Aug. 8, 1957 4 Sheets-Sheet 1
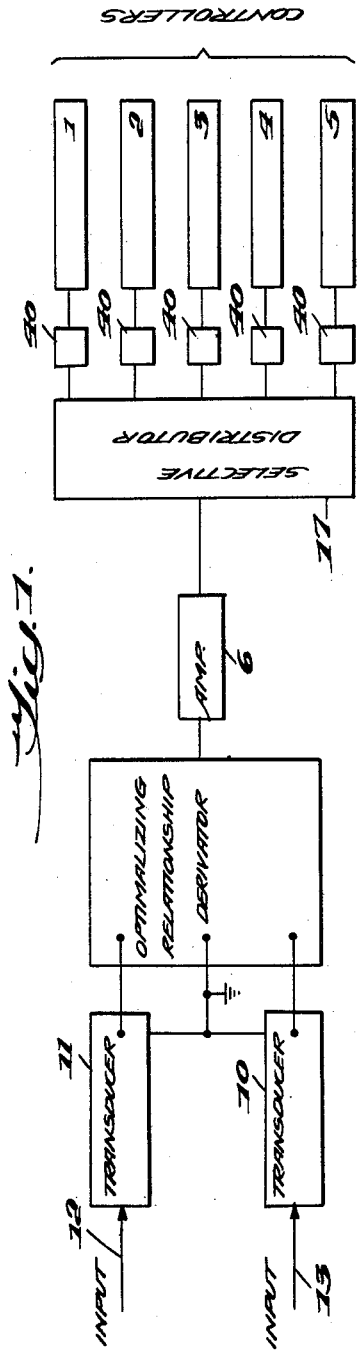
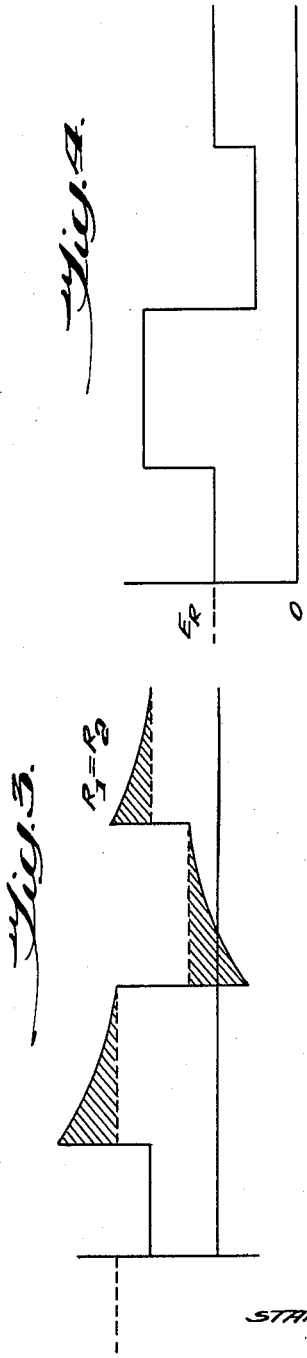
INVENTOR
STANLEY J. SARNOFF,
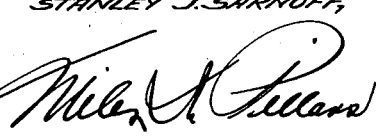
BY
ATTORNEY

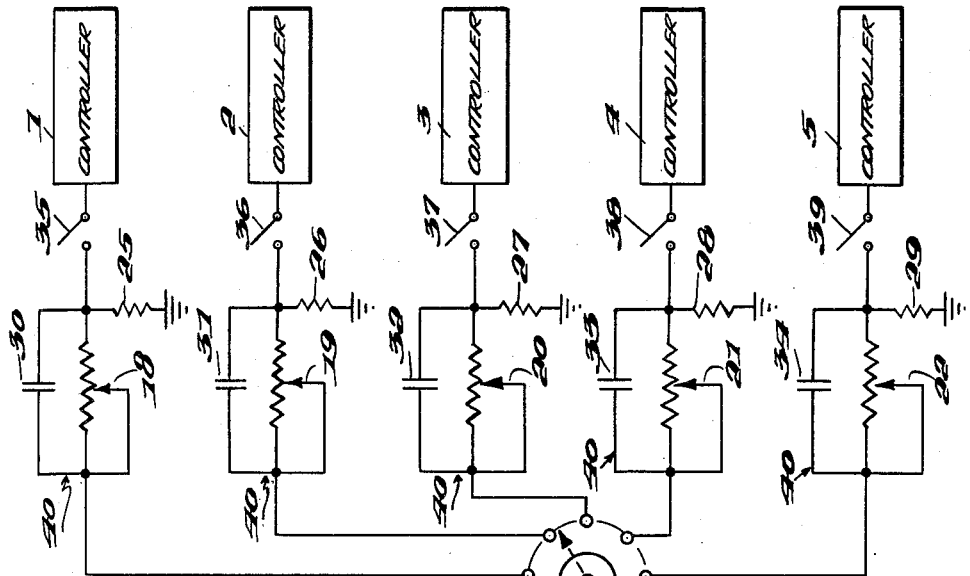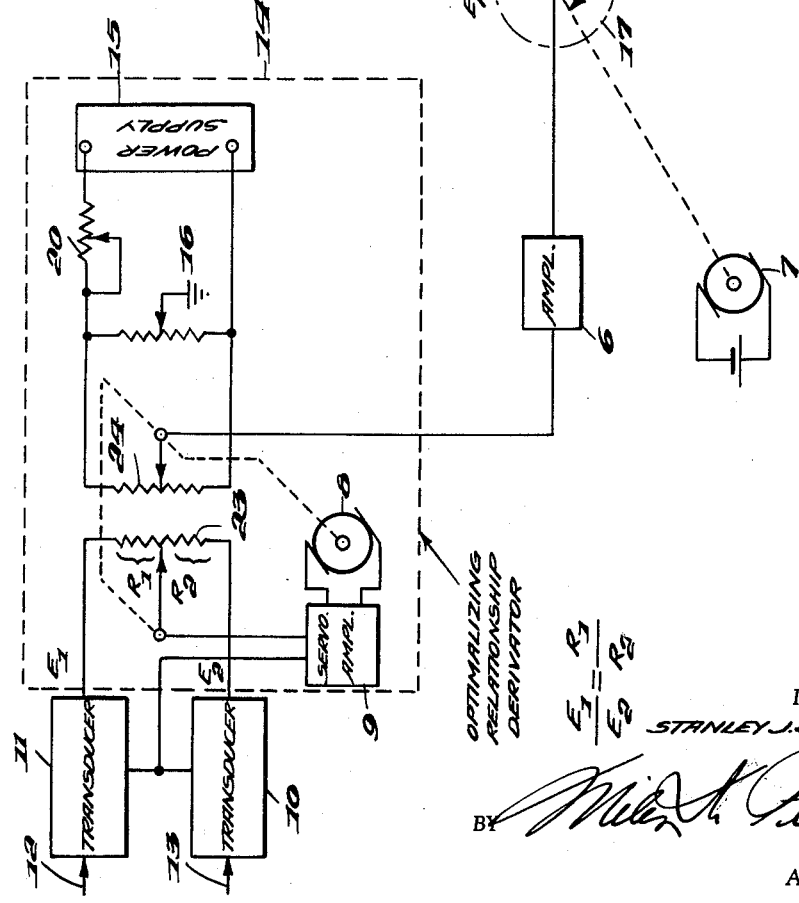

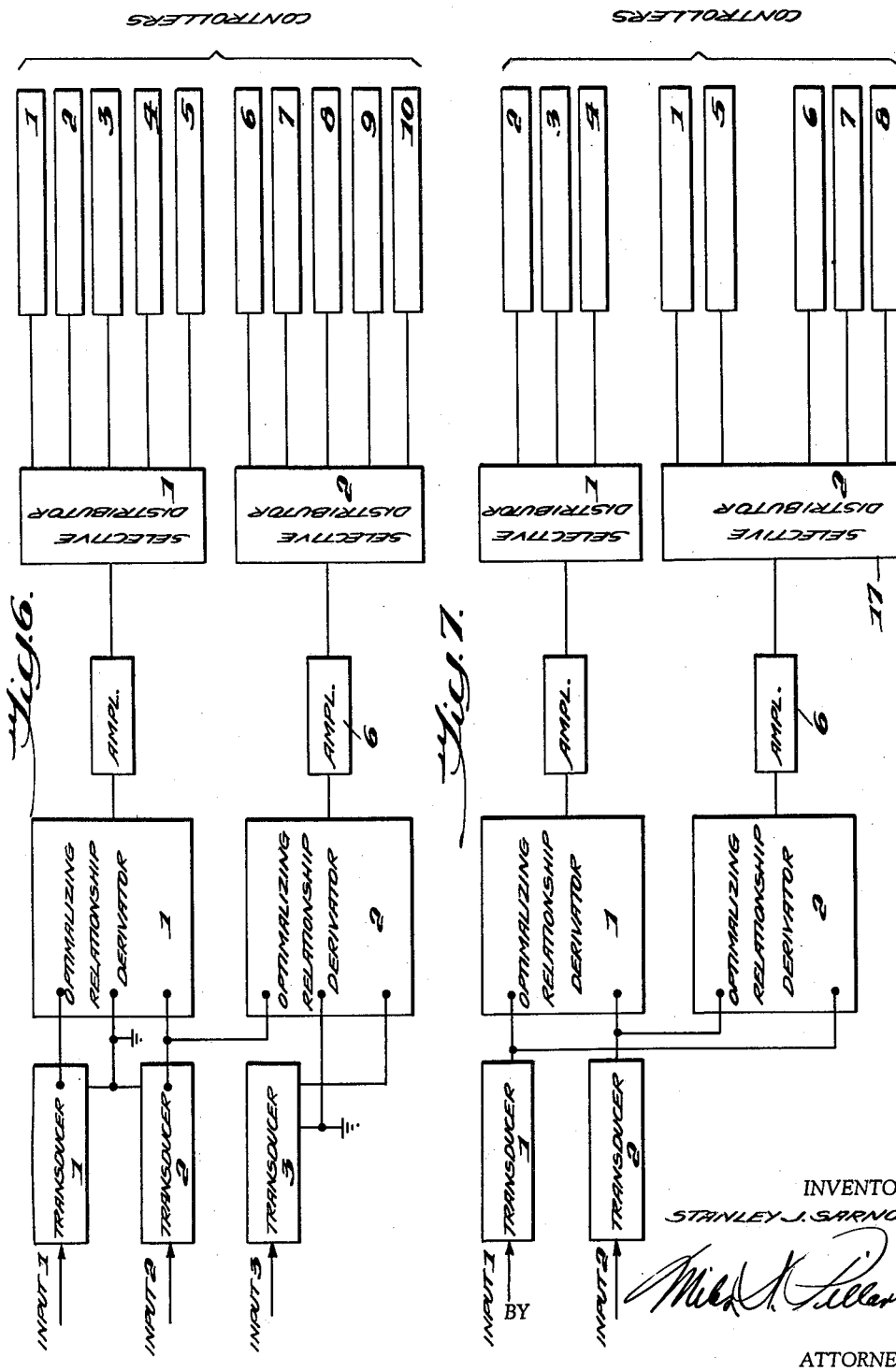

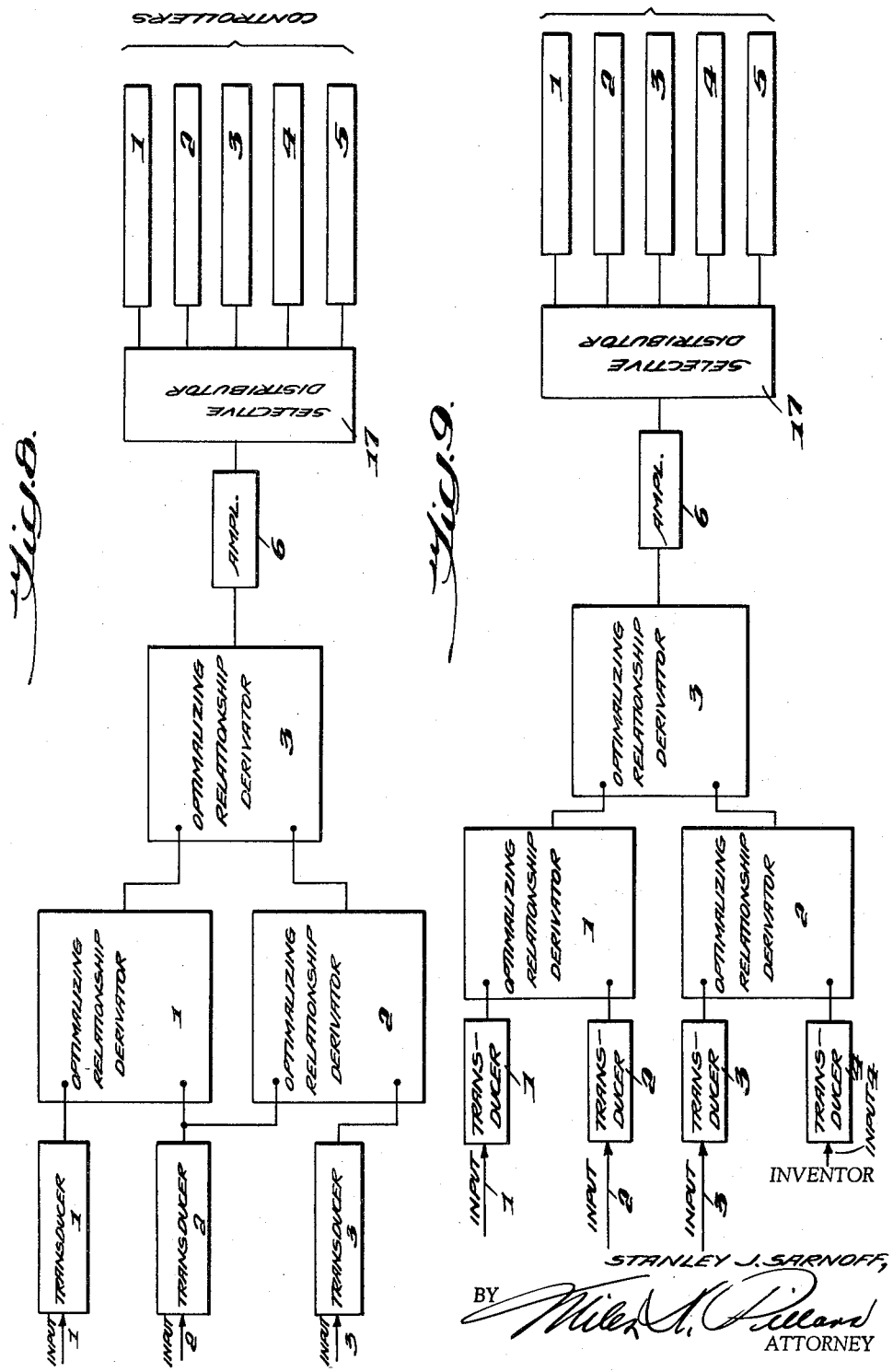

3,070,301
Patented Dec. 25, 1962

**3,070,301
CONTROL SYSTEMS**
Stanley J. Sarnoff, 7507 Hampden Lane, Bethesda, Md.
Filed Aug. 8, 1957, Ser. No. 677,085
11 Claims. (Cl. 235—151)

This invention relates to control systems for various types of mechanisms and procedures and more particularly to optimalizing control systems wherein the desired value or range of values of the controlled variables of the mechanism are not or need not be known while the system is operating to achieve the optimum adjustment of the mechanism. This type of system may be readily distinguished from conventional control systems wherein the relationship between the desired value or values of the controlled variables must be known in advance.

An object of this invention is to provide an improved control system for mechanisms and procedures having at least two operating parameters, each of which is a function of the operation of two or more controllers or regulated elements of the mechanisms or procedures wherein the optimum performance or results are obtained with reference to the relationship of such parameters as (a) Air or ground speed and fuel consumption so that the controlled vehicle can travel the greatest distance per unit of fuel consumed;

(b) Fuel consumption and stability so as to make it possible for a helicopter to hover for maximum periods of time while providing the greatest stability per unit of fuel consumption, whatever level that may be;

(c) The rate of feed of a catalytic agent and the rate of yield of the desired end product in chemical manufacturing processes so as to diminish the total amount of catalytic agent required to be available for any given rate of production and also diminish the number of times said agent must be reactivated per unit of end product manufactured;

(d) The hydrogen ion concentration of one ingredient and the hydrogen ion concentration of a second ingredient so as to hold the difference between them within a constant value or range in chemical manufacturing processes and thereby help to insure uniformity of the end product;

(e) Energy input and power output in steam power plant operation so as to acquire the maximum power yield per unit of energy input to the system;

(f) Tensile strength and rate of yield of end product in paper manufacture so as to achieve an end product of highest tensile strength at the maximum rate of yield;

(g) Dwell time and tensile strength in paper manufacturing processes so as to achieve the shortest dwell time in the various steps of manufacture per unit of end product tensile strength and thus achieve maximum rates of paper manufacture for any given tensile strength desired;

(h) The rate of yield of a machine tooled end product and the smoothness thereof so as to permit the maximum rate of yield of end product per unit of finish smoothness for any given acceptable level of finish smoothness; and (i) Temperature and humidity so as to maintain the environment of any enclosed space within the so-called "comfort zone" without necessarily having to achieve any particular specific level of either temperature or humidity.

The controllers or regulated elements of the mechanism or procedure by which the controlled variables are adjusted are well known to those skilled in each of the above arts and comprise, for example, throttle setting and air-fuel mixture controls of aircraft or vehicles; heating element energization and humidity control devices in air conditioning systems; regulation of hydrogen ion concentration, temperature control, viscosity control, rate of feed of various chemical ingredients and the intervals at which they are introduced in chemical manufacturing processes; rotations per minute of rotor blades, cyclic pitch and collective pitch in helicopter control systems; etc. For a more complete disclosure of operating parameters and regulated elements which are utilized in optimalizing control systems for various mechanisms and procedures, reference is made to Principles of Optimalizing Control Systems by Draper et al., A.S.M.E. Report, September 1951; Instruments and Automation, vol. 29, February 1956 pp. 294 et seq.; November 1956, pp. 2212 et seq. and AIEE Conference Paper entitled, Optimizing Control System by Cosgriff et al., May 1957.

Another object of this invention is to provide an improved control system for attaining the optimum, i.e., the best or otherwise most favorable relationship between a plurality of operating parameters or selected positions thereof which are functions of the operation of two or more controllers or regulating elements and which are inherent during operation of the mechanism or procedures to be optimally controlled. Such best or favorable relationship is determined by the operational characteristics of the mechanism and the objectives for which it is utilized, and this relationship is automatically achieved during operation of the system irrespective of the lack of prior knowledge concerning quantitative values of the relationship or the controlled variables and irrespective of the constancy of said values of the aforementioned relationship.

Another object of this invention is to provide an improved control system for obtaining an optimum relationship which is a mathematical function of a quotient, sum, difference or product of a plurality of operating parameters which are functions of two or more regulating elements of the mechanism under control.

Another object of the invention is to provide an optimalizing control system for a mechanism wherein the optimum, i.e. best or most favorable relationship between a plurality of operating parameters is obtained by utilizing apparatus which is common to all parameter sensing devices and selectively distributing an output thereof representative of said relationship to a plurality of regulating elements of the mechanism, thus additionally gaining the advantages of light weight, low cost and reliability, together with simplicity of installation, operation and maintenance.

Another further object of the invention is to provide an improved control system which enables a complex operating mechanism to achieve and maintain optimum adjustment of a plurality of its regulated elements irrespective of the fact that required functions for ideal regulation of the mechanism vary in unpredictable ways during operation so that they are not accurately known for a given controlled system at an arbitrary instant of time.

A further object of the invention is to provide an optimalizing control system wherein is utilized a plurality of operating parameter responsive devices or condition sensing units wherein an optimum or favorable relationship of operating parameters is achieved independently of the degree of accuracy of the said responsive devices or sensing units.

A still further object of the invention is to provide an optimalizing control system utilizing a plurality of units, each of which comprises two or more parameter sensing devices, the value of the output of which is representative of an optimum relationship, which value is selectively distributed to a plurality of regulated elements for the purpose of achieving an optimum relationship among a plurality of optimum relationships.

A still further object of the invention is to provide an optimalizing control system for a mechanism by which the optimum relationship between the operating parameters of the mechanism is obtained and utilized to control the regulating elements of the mechanism without the use of complicated and expensive analyzing and computing equipment.

In order to attain the foregoing objects, the optimalizing control system of the present invention preferably comprises the following components:

*Item:*

(1) Detecting or sensing devices which provide signals which are selected functions of two or more operating parameters of the mechanism, one or more of which parameters may be maintained at a preselected value;

(2) An optimalizing function selector or relationship derivator;

(3) A multiplexing or other distributing system;

(4) A plurality of response modifying networks; and (5) As many controllers or regulators associated with the distributing system and response modifying networks as there are variables which affect the relationship of the sensed parameters to be optimized.

The output of Item 2 above is channeled through the selective distributing system to each controller or regulating element. During the interval which connects the Item 2 derivator to a particular controller, the particular variable with which the latter is associated is caused to change in that direction which will render optimum the original relationship. Each controller is selectively affected by values representative of the output of the relationship derivator and caused to change its particular variable according to the desired optimum relationship. The period of operation may be selected to be frequent or infrequent as determined by the operating characteristics of the mechanism response and the period may be varied as to the duration and the sequence in a programming manner. During the interval when the controller of a particular regulating element is not connected or energized, the value of the variable which was extant at the end of the last period is maintained.

Thus, over an extended period of operation, all of the outputs or regulated variables of the regulating elements are caused, through operation of the system, to remain at, or change to, those values which render optimum the relationship of the aforementioned operating parameters of the mechanism.

It will be evident to those skilled in the art that the aforedescribed control system of the present invention may be utilized to construct a related series of performance curves for a complex system. For example, the settings of several variables are fixed and the optimum setting of another desired variable which results from the operation of the optimizing control system is observed, thus fixing one point on the curve. Altering the settings of the abovementioned variables will then permit the obtaining of other points on that curve. Another set of variables may then be fixed and the optimum setting of another selected variable is, in turn, similarly obtained, etc.

For purposes of illustration, and not by way of limitation, apparatus constructed in accordance with the teachings of the present invention will hereinafter be shown and described in connection with the regulation of certain controls of an aircraft in such manner that it will fly a maximum distance on any given amount of fuel, and thereby, in this sense, perform at optimum efficiency.

In the accompanying drawings:

FIG. 1 is a block diagram of the optimalizing control system;

FIG. 2 is a schematic circuit diagram of the control system shown in FIG. 1 applied to an aircraft;

FIGS. 3, 4 and 5 comprise curves representing the modes of operation of the response modifying networks 40 located between the controllers 1 to 5 inclusive and the selective distributor 17 of the control system shown in FIG. 2; and FIGS. 6 to 9 inclusive are block diagrams representing multiplexing embodiments wherein a plurality of optimalizing control devices, such as shown in FIG. 1, are combined.

According to the illustrative embodiment of the teachings of the present invention shown in FIG. 2, the quantities to be maintained in, or caused to achieve, a state of optimum relationship are airspeed and fuel flow parameters of flight. In this instance, a desirable relationship is that the ratio of airspeed to fuel flow be as high as possible. In order to achieve the optimum conditions, a number of the aircraft engine and flight controls must be adjusted so that each controlled variable achieves a condition which causes the Air Speed/Fuel Flow ratio to be as high as possible, regardless of any other variables.

In FIG. 2 there is illustrated a suitable means of optimizing Air Speed/Fuel Flow.

In this figure, $E_1$ represents an electrical signal derived from an airspeed sensing device which may be a conventional pitot tube 12 driving a voltage transducer 11.

In the same figure, $E_2$ represents an electrical signal, derived from a sensing device 13 and transducer 10, of the rate of flow of fuel to the engine. This may be any of several conventional remote indicating fuel rate systems, such as electromagnetic flowmeter using the Faraday generator principle, electromechanical flowmeter, etc. Such sensing devices are known to those skilled in the art for which reason further description is unnecessary.

$R_1$ and $R_2$ of optimalizing relationship derivator 14 form a potentiometer 23 whose wiper arm is driven by a servo motor 8.

$E_1$ and $E_2$ are connected in a Wheatstone bridge circuit with $R_1$, $R_2$, as shown in FIG. 2. If the arm of the potentiometer 23 is adjusted to make the voltage from the junction of $E_1$ and $E_2$ to the arm equal to zero, then the relation $$\frac{E_1}{E_2}=\frac{R_1}{R_2}$$

obtains. This condition is achieved by deriving a voltage proportional to the departure of adjustment of potentiometer 23 from balance conditions and using this voltage suitably amplified by a servo amplifier 9 to cause the servo motor 8 to restore the arm to balance conditions. The relation $$\frac{E_1}{E_2}=\frac{R_1}{R_2}$$

at balance is such that the position of the wiper arm of potentiometer 23 corresponds to the ratio of the two voltages $E_1/E_2$. With sufficient gain in the servo amplifier 9, this position is substantially independent of the absolute value of either $E_1$ or $E_2$.

On the same shaft driven by the same servo motor 8 as the wiper arm of potentiometer 23 is a second potentiometer 24. Potentiometers 24 and 16 are connected in another bridge circuit energized by power supply 15 through a variable resistor 20. The potentiometers 23, 24 and 16 may be linear or non-linear, as desired.

The position of the arm of potentiometer 24 is determined by the position of the arm of potentiometer 23, and thus by $E_1/E_2$, but the voltage output of the bridge is a function of the power supply voltage, the value of the variable resistor 20 and the position of the arm of potentiometer 16. The voltage output from this second bridge is proportional to the deviation of the ratio $E_1/E_2$ from the selected condition, as determined by the position of the arm of potentiometer 16; and is supplied through an amplifier 6 to a switching or multiplexing system 17, which in the present instance is shown as comprising a commutating switch 17, which is continuously driven in a cyclic manner by a motor 7.

This ratio error voltage is fed through the switching or multiplexing system indicated by reference numeral 17 to each of the regulating elements to be controlled through a network 40 of the type comprised of resistors 18 and 25, and a capacitor 30. The variables to be controlled in the case of aircraft control, such as propeller pitch, throttle setting, etc., are simply illustrative of the type, but the invention is in no sense limited to these. Any other variables which serve to influence Air Speed/Fuel Flow through the effect on the performance of the aircraft may be substituted or added.

The networks indicated by reference numeral 40 are of the type known as differentiating or lead networks. In this type of network, as illustrated in FIG. 2, $R_1$ is exemplified by resistors 18, 19, 20, 21 and 22, etc.; $R_2$ is exemplified by resistors 25 through 29; and $C_1$ is exemplified by the capacitors 30 through 34. If the ratio error voltage is fed through such a network, the values of the resistors 18 and 25 and capacitor 30 can be chosen to give the following types of output to the controllers:

*Example No. 1 (FIG. 3):*

$R_1 = kR_2$    $.1 < k < 10$
$C_1$ selected such that
$|x_c| > 10\ R_{25}$ at upper response frequency of aircraft to variable 1

Output (approximately)

$$\frac{dE_r}{dt} + \frac{E_r}{k+1}$$

*Example No. 2 (FIG. 4):*

$R_1 = kR_2$    $.1 < k < 10$
Capacitor $30 = 0$ $$\text{Output} = E_R \frac{R_{25}}{(k+1)R_{25}} = \frac{E_r}{k+1}$$

*Example No. 3 (FIG. 5):*

$R_1 >>> R_2$
$C_1$ selected such that
$|x_c| > 10\ R_{25}$ at upper response frequency of aircraft to variable 1

Output (approximately) $dE_r/dt$.

If the ratio $E_1/E_2$ is to be maximized, rather than set to some fixed value, the arm of potentiometer 16 is set to the end nearest the resistor 20. The networks comprising the resistors 18, 25 and capacitor 30 are chosen such that Example No. 3 is achieved. The output of the network will be a voltage of one polarity or sign if the ratio $E_1/E_2$ is increasing, and a voltage of opposite polarity or sign if the ratio $E_1/E_2$ is decreasing as shown in FIGURE 5.

The controller, as determined by this voltage of appropriate polarity, then adjusts the variable such as throttle setting, during the interval that $E_r$ is applied to 1, in the direction which causes the ratio $E_1/E_2$ to increase. If, during that interval, $E_1/E_2$ achieves a condition which neither increases nor decreases, the output of the network will be zero and the controller will cease to adjust the throttle setting. If, during such interval, the ratio should tend to decrease, the controller will be caused to change the throttle setting in an opposite direction, thus forcing the ratio $E_1/E_2$ back toward a maximum.

The above sequence of events is continued for each controller and variable until the switching or multiplexing system 17 has applied the ratio error voltage to each controller. This process is performed at a rate which is compatible with optimization and with the response characteristics of the engine and aircraft performances.

Assuming for purposes of illustration controller 1 adjusts the setting of the throttle of the aircraft engine, or engines, as mentioned hereinbefore, the other controllers 2, 3, 4 and 5 may be constructed and arranged to adjust the Carburetor mixture;
Carburetor heat;
Supercharger pressure; and
Propeller pitch, respectively.

To the foregoing parameters of flight (i.e., engine throttle, carburetor mixture, carburetor heat, supercharger pressure and propeller pitch) others may be added; and the switching or multiplexing system 17 may take the form of any single or multiple pole switch with as many positions as there are functions to be controlled. Other known multi-channel data transmission systems may be utilized to transfer the information between the parameter sensing devices and the regulated elements or controllers.

Thus, the control system as described hereinbefore will, at desired intervals, influence each of those controllable aspects of the aircraft's performance which bear on the simple desired objective of producing the highest engine efficiency so far as concerns the number of miles travelled per unit of fuel.

One of the most important features of such a control system is that it eliminates non-essentials, such as altitude, attitude, plane load or wind direction, etc. At any altitude, attitude, plane load or wind direction selected, the pilot of the aircraft may, by switching in the control system of the present invention, fly farther on any given amount of fuel, without it being necessary for the system to concern itself with, or in any way respond to, extraneous information.

The teachings of the present invention contemplate means for excluding control of one or more of the pertinent variables involved in optimalizing the $$\frac{\text{Air Speed}}{\text{Fuel Flow}}\text{ ratio}$$

For example, if the pilot, for any reason, wishes to fly at some air speed above or below that which will give the highest $$\frac{\text{Air Speed}}{\text{Fuel Flow}}\text{ ratio}$$

he may simply exclude (by any suitable switching means such as switch 35) controller 1 which optimalizes the throttle control. While the aforementioned variables are being sampled and made to seek their optimal settings, he may manually adjust the engine throttle so as to achieve the air speed he desires. The control system of the invention will then continue to seek that setting of each of the other variables which will give the highest $$\frac{\text{Air Speed}}{\text{Fuel Flow}}\text{ ratio}$$

at that particular air speed.

There is also contemplated the exclusion, singly or in combination, of the effect or influence of each of the other variables by selected operation of switches 36, 37, 38 and 39 in addition to switch 35. Should the seeking of the optimum relationship by the control system cause the aircraft to begin to approach unsafe or undesirable flight conditions, it is contemplated that appropriate limiting devices may be utilized to prevent further adjustment which might result in an actual unsafe condition.

It is also within the purview of the invention to cross-couple the signals to the various controllers, both before, after and among the response modifying networks. For example, the junctions of resistors 18 and 25 and resistors 20 and 27 may be cross-coupled through suitable response modifying networks.

Among the virtues of the control system of the present invention is that it will yield the same optimal desired result whether the information into the system is either precise or approximate. For example, if the signal for either Air Speed or Fuel Flow, or both, is not accurate (i.e., has shifted zeros, has percentage errors in reading, is non-linear, etc.) it will make no difference (unless the signal is actually reversed and has a wrong direction), for the control device will establish the highest Air Speed/Fuel Flow ratio regardless of the magnitude or accuracy of either or both signals. As long as this situation obtains, the aircraft will cover the longest possible distance on any given amount of fuel, at that altitude, plane load, attitude, etc., in fact, without even requiring any information with respect to these latter quantities and any changes therein which may occur.

The optimalizing control system of this invention may be combined with one or more similar systems to afford the multiplexing of a plurality of optimalizing channels.

Where the controlled mechanism has more than two operating parameters the optimalizing control system thus described can optimize the performance of the mechanism with respect to combinations and permutations of the multiplicity of signals derived from these operating parameters by selecting the inputs two at a time as shown in FIGS. 6 to 9 inclusive.

Where two or more optimalizing control systems are so combined in utilizing two or more inputs, the outputs to the controllers or regulating elements may then also be combined in various combinations and permutations of the outputs of the several optimalizing control systems, as in FIGS. 6 and 7. This provides for the dependent and independent controlled variables to be selectively sorted into separate groups.

Where the optimum performance of a mechanism depends on complex functions of relationships among two or more operating parameters, the optimalizing control systems are applied in sets among combinations and permutation of inputs and the outputs of such sets are combined in at least a third optimalizing control system as shown in FIGS. 8 and 9. The resultant output is then an optimal function among sets of optimal relationships. Further arrangements of inputs and outputs of several optimalizer units will be obvious to those skilled in the art.

While I have shown and described certain specific embodiments of the present invention, it will be readily understood by those skilled in the art that I do not wish to be limited exactly thereto, since various modifications may be made without departing from the scope of the invention as defined in the appended claims.

I claim:

1. An optimalizing control system for a mechanism for attaining an optimum relationship between a plurality of operating parameters of the mechanism, which relationship is dependent upon the adjustment in accordance with the polarity of a signal which is a function of said relationship of at least two regulating elements which effect the operation of said mechanism, comprising in combination, at least two adjustable regulating elements for said mechanism and means for adjusting said regulating elements, said means comprising at least two translating devices, each actuated by an input quantity derived from said operating parameters, means for sensing the polarity of relationship achieved with respect to the optimum relationship between the outputs of said translating devices during operation of said mechanism, means for converting the output of said optimum relationship sensing means to control values, means for changing said control values to non-linear control values of the degree to which said optimum relationship has been achieved, and means for separately actuating said regulating elements by said non-linear control values.

2. An optimalizing control system for a mechanism for attaining an optimum relationship between a plurality of operating parameters of the mechanism, which relationship is dependent upon the adjustment in accordance with the polarity of a signal which is a function of said relationship of at least two regulating elements which effect the operation of said mechanism, comprising in combination, at least two adjustable regulating elements for said mechanism and means for adjusting said regulating elements, said means comprising at least two translating devices, each actuated by an input quantity derived from said operating parameters, means for sensing the polarity of the relationship achieved with respect to the optimum relationship between the outputs of said translating devices during operation of said mechanism, means for converting the output of said optimum relationship sensing means to control values, and distributing means positioned intermediate said converting means and said adjustable regulating elements for separately transferring said control values to said regulating elements to effect the operation thereof.

3. An optimalizing control system for a mechanism for attaining an optimum relationship between a plurality of operating parameters of the mechanism, which relationship is dependent upon the adjustment in accordance with the polarity of a signal which is a function of said relationship of at least two regulating elements which effect the operation of said mechanism, comprising in combination, at least two signal responsive regulating elements for said mechanism and means for adjusting said signal responsive regulating elements, said means comprising at least two transducers, each responsive to an input condition derived from said operating parameters, means for sensing the polarity of the relationship achieved with respect to the optimum relationship between the outputs of said transducers during operation of said mechanism, means for converting the output of said optimum relationship sensing means to electrical control signals, and switch means positioned between said regulating elements and said converting means separately to distribute said control signals from said converting means to said regulating elements to effect the operation thereof.

4. An optimalizing control system as defined in claim 3, wherein said switch means comprises a distributing selector by which the regulating elements are sequentially energized by said control signals.

5. An optimalizing control system as defined in claim 3, wherein said switch means comprises a programming selector by which the regulating elements are cyclically and sequentially energized by said control signal.

6. An optimalizing control system for a mechanism for attaining an optimum relationship between a plurality of operating parameters of the mechanism, which relationship is dependent upon the adjustment in accordance with the polarity of a signal which is a function of said relationship of at least two regulating elements which effect the operation of said mechanism, comprising in combination, at least two signal responsive regulating elements for said mechanism and means for adjusting said signal responsive regulating elements, said means comprising at least two transducers, each responsive to an input condition derived from said operating parameters, means for sensing the polarity of the relationship achieved with respect to the optimum relationship between the outputs of said transducers during operation of said mechanism, means for converting the output of said optimum relationship sensing means to electrical control signals, switch means for separately distributing said control signals to said regulating elements, and signal modifying means positioned between said regulating elements and said converting means.

7. An optimalizing control system for a mechanism for attaining an optimum relationship between a plurality of operating parameters of the mechanism, which relationship is dependent upon the adjustment in accordance with the polarity of a signal which is a function of said relationship of at least two regulating elements which effect the operation of said mechanism, comprising in combination, at least two signal responsive regulating elements for said mechanism which are provided with manually adjusting means and means for adjusting said signal responsive regulating elements, said latter means comprising at least two transducers, each responsive to an input condition derived from said operating parameters, means for sensing the polarity of the relationship achieved with respect to the optimum relationship between the outputs of said transducers during operation of said mechanism, means for converting the output of said optimum relationship sensing means to electrical control signals, means for separately actuating said signal responsive regulating elements by said electrical control signals, and switch means for individually de-energizing a selected number of said regulating elements to permit adjustment by said manually adjusting means.

8. A plural channel optimalizing control system for a mechanism for attaining an optimum relationship between a plurality of operating parameters of the mechanism, which relationship is dependent upon the adjustment in accordance with the polarity of a signal which is a function of said relationship of a plurality of regulating elements which effect the operation of said mechanism, comprising in combination a plurality of adjustable regulating elements for said mechanism and means for adjusting said regulating elements, said means comprising at least three translating devices, each actuated by an input quantity derived from said operating parameters, a plurality of means each of which is actuated by at least two of said translating devices for sensing the polarity of the relationship achieved with respect to the optimum relationship between the outputs of said translating devices during the operation of said mechanism, means for converting the output of each of said optimum relationship sensing means to separate groups of control values, and means for separately actuating different regulating elements by said separate groups of control values from each of said converting means.

9. A plural channel optimalizing control system for a mechanism for attaining an optimum relationship between a plurality of operating parameters of the mechanism, which relationship is dependent upon the adjustment in accordance with the polarity of a signal which is a function of said relationship of a plurality of regulating elements which effect the operation of said mechanism, comprising in combination a plurality of adjustable regulating elements for said mechanism and means for adjusting said regulating elements, said means comprising at least three translating devices, each actuated by an input quantity derived from said operating parameters, a plurality of means each of which is actuated by at least two of said translating devices for sensing the polarity of the relationship achieved with respect to the optimum relationship between the outputs of said translating devices during the operation of said mechanism, means for converting the output of each of said optimum relationship sensing means to separate groups of control values, additional means for sensing the optimum relationship among the said separate groups of control values and for obtaining composite control values therefrom, and means for separately actuating said regulating elements by said composite control values from said additional means.

10. A plural channel optimalizing control system for a mechanism for attaining an optimum relationship between a plurality of operating parameters of the mechanism, which relationship is dependent upon the adjustment in accordance with the polarity of a signal which is a function of said relationship of a plurality of regulating elements which effect the operation of said mechanism, comprising in combination a plurality of adjustable signal responsive regulating elements for said mechanism and means for adjusting said signal responsive regulating element, said means comprising at least three transducers, each responsive to an input condition derived from said operating parameters, a plurality of means each of which is actuated by at least two of said transducers for sensing the polarity of the relationship achieved with respect to the optimum relationship between the outputs of said transducers during operation of said mechanism, means for converting the output of each of said optimum relationship sensing means to separate groups of electrical control signals, and means for separately actuating different signal responsive regulating elements by said separate groups of electrical control signals.

11. A plural channel optimalizing control system for a mechanism for attaining an optimum relationship between a plurality of operating parameters of the mechanism, which relationship is dependent upon the adjustment in accordance with the polarity of a signal which is a function of said relationship of a plurality of regulating elements which effect the operation of said mechanism, comprising in combination a plurality of adjustable signal responsive regulating elements for said mechanism and means for adjusting said signal responsive regulating element, said means comprising at least three transducers, each responsive to an input condition derived from said operating parameters, a plurality of means each of which is actuated by at least two of said transducers for sensing the polarity of the relationship achieved with respect to the optimum relationship between the outputs of said transducers during operation of said mechanism, means for converting the output of each of said optimum relationship sensing means to separate groups of electrical control signals, additional means for sensing the optimum relationship among the said separate groups of control signals and for obtaining composite control signals therefrom, and means for separately actuating said signal responsive regulating elements by said composite control signals.

References Cited in the file of this patent
UNITED STATES PATENTS
2,687,612     Anderson et al.           Aug. 31, 1954

OTHER REFERENCES

Automatic Control, vol. 1–2, Feb. 1955, pgs. 27–32.